US011735884B2

(12) United States Patent
Flaig et al.

(10) Patent No.: US 11,735,884 B2
(45) Date of Patent: Aug. 22, 2023

(54) METHODS AND LASER SYSTEMS FOR GENERATING AMPLIFIED PULSE-ON-DEMAND OUTPUT LASER PULSES

(71) Applicant: TRUMPF LASER GMBH, Schramberg (DE)

(72) Inventors: Rainer Flaig, Schramberg (DE); Stefan Rapp, Schramberg (DE); Fred Stier, Schramberg (DE)

(73) Assignee: TRUMPF LASER GMBH, Schramberg (DE)

( * ) Notice: Subject to any disclaimer, the term of this patent is extended or adjusted under 35 U.S.C. 154(b) by 643 days.

(21) Appl. No.: 16/931,558

(22) Filed: Jul. 17, 2020

(65) Prior Publication Data

US 2020/0350739 A1    Nov. 5, 2020

Related U.S. Application Data

(63) Continuation of application No. PCT/EP2019/051104, filed on Jan. 17, 2019.

(30) Foreign Application Priority Data

Jan. 18, 2018  (DE) .................... 102018200811.6

(51) Int. Cl.
*H01S 3/00* (2006.01)
*H01S 3/10* (2006.01)
(Continued)

(52) U.S. Cl.
CPC ...... *H01S 3/10015* (2013.01); *H01S 3/10046* (2013.01); *H01S 3/1302* (2013.01); *H01S 3/2391* (2013.01)

(58) Field of Classification Search
None
See application file for complete search history.

(56) References Cited

U.S. PATENT DOCUMENTS 11,165,214 B2 * 11/2021 Flaig .................... H01S 3/2308
2014/0050235 A1    2/2014 Clowes et al.
(Continued)

FOREIGN PATENT DOCUMENTS

CN          103500913 A  *  1/2014  ............ H01S 3/067
DE          102014017568 A1     6/2016
(Continued)

OTHER PUBLICATIONS

DE Office Action in German Appln. No. 102018200811.6, dated Jan. 11, 2019, 15 pages (with English translation).
(Continued)

*Primary Examiner* — Mark Hellner
(74) *Attorney, Agent, or Firm* — Fish & Richardson P.C.

(57) ABSTRACT

Methods and laser systems are disclosed for generating amplified output laser pulses with individually specified pulse energies and/or pulse shapes at individually specified time points at an output by providing a first pulse sequence of input laser pulses with a same pulse energy and a same temporal pulse distance smaller than a temporal pulse distance between adjacent output laser pulses, selecting input laser pulses arriving at the output at or close to the specified time points to form a second pulse sequence of input laser pulses, coupling at least one sacrificial laser pulse (energy balance or temporal balance) into the second pulse sequence, amplifying the second pulse sequence of input laser pulses with the sacrificial laser pulse, and coupling out the amplified sacrificial laser pulse from the amplified second pulse sequence upstream of the output to obtain the amplified output laser pulses.

21 Claims, 4 Drawing Sheets

(51) Int. Cl.
*H01S 3/13* (2006.01)
*H01S 3/23* (2006.01)

(56) References Cited

U.S. PATENT DOCUMENTS

2018/0309258 A1* 10/2018 Honninger .............. H01S 3/235
2020/0127434 A1*  4/2020 Flaig .................... H01S 3/1302

FOREIGN PATENT DOCUMENTS

| DE | 102014017568 B4 * | 12/2016 | .......... H01S 3/1302 |
| DE | 102017210272 B3 | 11/2018 | |
| WO | WO 2008016287 * | 2/2008 | ............. H01S 3/235 |
| WO | WO 2013185792 A1 * | 12/2013 | ................ G02F 1/11 |
| WO | WO 2017/068282 A1 | 4/2017 | |
| WO | WO 2018/234162 A1 | 12/2018 | |
| WO | WO 2019/141757 A1 | 7/2019 | |

OTHER PUBLICATIONS

PCT International Preliminary Report on Patentability in International Appln. No. PCT/EP2019/051104, dated Jul. 21, 2020, 24 pages (with English translation).
PCT International Search Report and Written Opinion in International Appln. No. PCT/EP2019/051104, dated Apr. 10, 2019, 27 pages (with English translation).

* cited by examiner

METHODS AND LASER SYSTEMS FOR GENERATING AMPLIFIED PULSE-ON-DEMAND OUTPUT LASER PULSES

CROSS REFERENCE TO RELATED APPLICATIONS

This application is a continuation of and claims priority under 35 U.S.C. § 120 from PCT Application No. PCT/EP2019/051104, filed on Jan. 17, 2019, which claims priority from German Application No. 10 2018 200 811.6, filed on Jan. 18, 2018. The entire contents of each of these priority applications are incorporated herein by reference.

TECHNICAL FIELD

The present disclosure relates to generating amplified output laser pulses, particularly with individually specified pulse energies and/or pulse shapes at individually specified time points.

BACKGROUND

Known short pulse laser systems (e.g., with fs or ps pulse durations) have a clock-rate-dependent laser pulse energy at constant pump power and are generally operated with a constant frequency. In some cases, users may wish to operate the laser pulses with freely selectable triggering (e.g., with ns jitter) and constant settable pulse energy, e.g., pulse on demand (POD).

SUMMARY

The present disclosure provides methods, devices, systems, and non-transitory machine readable storage media for generating amplified output laser pulses with individually specified pulse energies at individually specified time points, e.g., by specifying fast energy-stabilized pulses on demand (POD).

One aspect of the present disclosure features methods for generating amplified output laser pulses with individually specified pulse energies and/or pulse shapes at individually specified time points at an output. The methods include the following method steps:

providing a pulse sequence of input laser pulses with the same pulse energy, e.g., with the same temporal pulse distance, which is smaller than the temporal pulse distance between two neighboring output laser pulses;

selecting the input laser pulses that arrive at the output in each case at the specified time points or closest to the specified time points;

amplifying the selected input laser pulses using an optical amplifier having a specified, amplification-free minimum time period and a specified, amplification-free maximum time period;

incoupling (or coupling in) an energy balance sacrificial laser pulse at a temporal distance of less than the maximum time period before at least one, e.g., each, input laser pulse that is to be amplified;

for the case that the temporal pulse distance between two successive input laser pulses that are to be amplified is greater than the maximum time period, inserting at least one sacrificial laser pulse, which is spaced apart from the subsequent input pulse that is to be amplified by at most the maximum time period, in particular by the maximum time period, before the subsequent one of the two successive input laser pulses that are to be amplified, into the pulse sequence of the selected input laser pulses; and outcoupling (or coupling out) the amplified sacrificial and energy balance sacrificial laser pulses from the pulse sequence of the amplified input pulses upstream of the output, so as to obtain the output laser pulses at the output with the specified pulse energies at the specified time points.

In some embodiments, all the amplified output laser pulses have the same pulse energy.

In some embodiments, the pulse energy of the energy balance sacrificial laser pulses is adapted in dependence on the distance from the previous pulse and the pulse energy of the sacrificial laser pulses is the same as the pulse energy of the input laser pulses that are to be amplified.

The present disclosure is based on the fact that, after a pulse, the inversion in the gain medium of the amplifier first has to be built up again so as to ensure a pulse-to-pulse stability. In addition, the amplification in the case of pulse pauses that are too long will become so large that excessive pulse increases occur.

Implementations of the present disclosure include laser clock processing and pulse energy correction.

The laser clock processing has the task of keeping the basic clock within a frequency range that is safe for the laser system and of "clocking in" pulse requests (pulse triggerings) made by the user with ns-precision. In addition, a check is performed as to whether the pulse request lies outside a specified time window, which is given by the behavior of the gain medium. If the pulse distance is too long, an intermediate pulse (e.g., a sacrificial laser pulse) is inserted, which is then directed onto an absorber.

The pulse energy correction of the amplified output pulses to the specified pulse energies is effected by timed incoupling of a prepulse (e.g., energy balance sacrificial laser pulse) that is variable in its pulse energy in dependence on the known pulse distances thereof from the respectively immediately preceding input or sacrificial laser pulse. The greater this pulse distance of an input laser pulse or of a sacrificial laser pulse, the greater the inversion that has built up in the amplifier and the greater the pulse energy of the amplified input laser pulse. The pulse energy of the energy balance sacrificial laser pulse is set in dependence on the known pulse distance from the respectively immediately preceding, amplified input or sacrificial laser pulse, to obtain output laser pulses with the specified pulse energy.

The methods can work by way of targeted temporal driving of the selected input pulses and temporal balance sacrificial laser pulses or energy balance sacrificial laser pulses. This procedure is faster than pulse energy regulation of the output laser pulses. In some embodiments, operation proceeds with constant pump power for the amplifier, with the result that a high thermal equilibrium and a temporally nearly constant thermal lens can be achieved and, as a result, the function of the optical components can be improved.

For the selected input laser pulses, the expected pulse energy of the amplified output laser pulses can be determined in advance, and the pulse energy of the energy balance sacrificial laser pulses is controlled on the basis of a comparison of the expected pulse energy to the specified pulse energy. For example, the expected pulse energy can be determined from the simulated behavior of the amplifier in dependence on the pulse distance and pulse energy of the selected input laser pulses and the pump power of the amplifier. Said simulation can be effected via a nonlinear model which is a function of the pulse distance, the pulse energy of the selected input laser pulses, the power of the pulses to be amplified, and the pump power.

If the temporal pulse distance of a selected input laser pulse from the immediately preceding, selected input laser pulse is smaller than the minimum time period, a different input laser pulse can be selected instead, the temporal pulse distance of which from the immediately preceding, selected input laser pulse is the same as or minimally greater than the minimum time period. For example, it is possible for a delay signal to be superposed on the actual selection signal and for an input laser pulse to be selected, the temporal pulse distance of which is the same as or minimally greater than the minimum time period. For example, all the trigger signals selecting the input laser pulses can be subjected to a delay, with the result that the minimum time period is maintained for all trigger signals and sacrificial laser pulses can be inserted, if appropriate. In other words, all selected input laser pulses are subjected to a fixed delay in this embodiment. The minimum time period is at least long enough that an assessment as to whether sacrificial and/or energy balance sacrificial laser pulses are required can be performed.

As an energy balance sacrificial laser pulse, an input laser pulse that is trimmed in its pulse energy or an external laser pulse having, e.g., a different wavelength than the wavelength of the input laser pulses, can be inserted into the pulse sequence of the selected input laser pulses.

As a sacrificial laser pulse, one of the input laser pulses or, alternatively, an external laser pulse having, e.g., a different wavelength than the wavelength of the input laser pulses can be inserted into the pulse sequence of the selected input laser pulses.

The temporal pulse distance between two neighboring output laser pulses can be greater by at least one order of magnitude than the temporal pulse distance of the input laser pulses. The clock frequency of the input laser pulses for example can lie in the frequency range of, for example, 10 MHz to 200 MHz.

To prevent excessive increases at the first output laser pulse of a requested pulse sequence, it is advantageously possible to insert at least one sacrificial and/or energy balance sacrificial laser pulse into the pulse sequence of the selected input laser pulses before the first selected input laser pulse.

In some embodiments, an energy balance sacrificial laser pulse is coupled into the amplifier before each input laser pulse that is to be amplified. Outcoupling the amplified sacrificial and energy balance sacrificial laser pulses can be effected either at different output coupling units or at the same output coupling unit.

For a stable operation of the laser, the maximum time period can be a multiple of the minimum time period, e.g., twice as long as the minimum time period.

In a further embodiment, bursts are generated from a plurality of selected, equidistant input laser pulses, and an energy balance sacrificial burst and, if necessary, a sacrificial burst is inserted between two bursts of a burst sequence, the sacrificial bursts each advantageously having the same number of laser pulses and the same pulse distance as in the actual burst, to improve the stability of the laser system on account thereof. If the distance $T_{max}$ between two bursts of a burst sequence is exceeded, a sacrificial burst with the same equidistant inter-pulse distance as the individual input laser pulses of the bursts is inserted. In some embodiments, the number of the pulses of a sacrificial burst corresponds to the number of the pulses of an input burst and the number of the pulses of an energy balance sacrificial burst corresponds to the number of the pulses of an input burst.

Another aspect of the present disclosure features laser systems for generating amplified output laser pulses with individually specified pulse energies and/or pulse shapes at individually specified time points at an output. The laser systems include a pulsed laser source for generating input laser pulses with the same pulse energy and in particular the same temporal pulse distance, which is smaller than the temporal pulse distance between two neighboring output laser pulses, a selection unit (or a optical selector such as a pulse picker) for selecting some of the input laser pulses, an optical amplifier for amplifying the selected input laser pulses, an optical output coupling unit (or an optical output coupler) for coupling out at least one portion of the amplified laser pulses, and a control unit (or a controller), which is programmed to temporally drive the selection and output coupling units according to the above-described method.

The control unit can include a comparison unit (or a comparator), which compares the pulse distances of the selected input laser pulses to a specified maximum time period and, if the pulse distance is too great, outputs a control signal to the selection unit or to an external pulse source to insert a sacrificial laser pulse into the pulse sequence of the selected input laser pulses.

The control unit has, in further embodiments, a determination and comparison unit, which determines the expected pulse energy of the amplified output laser pulses in advance for the selected input laser pulses and compares it to the specified pulse energy and outputs a control signal to the energy balance sacrificial laser pulse generating means (e.g., the pulse picker), to generate an energy balance sacrificial laser pulse with defined pulse energy, to couple out an output laser pulse with the specified pulse energy in this way.

The laser system can also include a user request system, connected to the control unit, for individually specifying the pulse energies and/or shapes and the time points of the amplified output laser pulses at the output and optionally an external pulse source (for example a pulsed diode, a cw diode with an optical switch (e.g., AOM) or a diode with a fiber amplifier), e.g., with a different wavelength than the pulse source, for generating a sacrificial and/or energy balance sacrificial pulse that is to be inserted into the pulse sequence of the selected input laser pulses. In the case of an external pulse source, a wavelength-selective element (or a wavelength selector) (e.g., a dichroic mirror, a diffractive element, a volume Bragg grating (VBG)) for coupling out the sacrificial laser pulse can be arranged upstream or downstream of the output coupling unit.

In some embodiments, the selection and output coupling units each have an acousto-optic modulator (AOM) or an electro-optic modulator (EOM).

To achieve the pulse shape or a pulse energy change, the output coupling unit can be driven with a predefined switching profile or an additional modulator can be arranged downstream of the amplifier at the system output.

A further aspect of the present disclosure features a control program product having code means adapted to carry out all the steps of the above-described method when the program is executed on a control unit of a laser system.

Further advantages and advantageous configurations of the subject matter of the invention are evident from the description, the claims, and the drawing. The aforementioned features and the features mentioned further below can likewise be employed in each case by themselves or in a plurality in any desired combination. The embodiments shown and described should not be understood to be an exhaustive list, but rather have an exemplary character for the purpose of illustrating the invention.

DETAILED DESCRIPTION

In the following description of the drawing, identical reference signs are used for the same components or for components having the same function.

Figure 1:
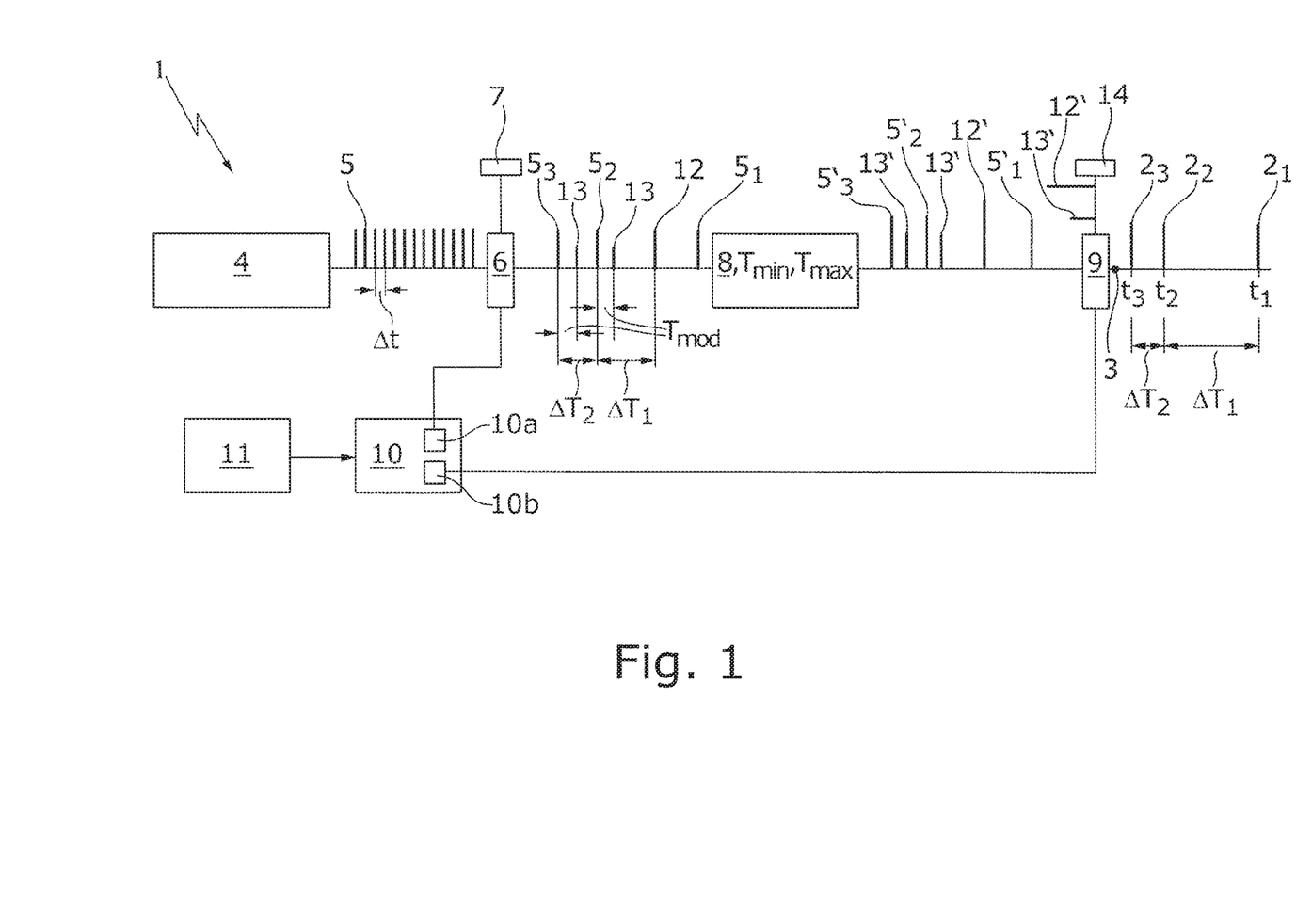
FIG. 1 schematically shows a first embodiment of a laser system according to the present disclosure for generating identical, amplified output laser pulses using inserted sacrificial and energy balance sacrificial laser pulses.

A laser system 1 shown in FIG. 1 serves to generate a plurality of (in the example here only three) amplified output laser pulses $2_1$, $2_2$, $2_3$ with individually specified pulse energies at individually specified time points (pulse on demand—POD) at an output 3.

The laser system 1 includes a pulse source 4 for providing a pulse sequence of input laser pulses 5 with the same pulse energy and the same temporal pulse distance $\Delta t$, which is smaller by orders of magnitude than the temporal pulse distance $\Delta T_1$, $\Delta T_2$ between two neighboring output laser pulses $2_1$, $2_2$, $2_3$. The clock frequency of the input laser pulses 5 is fixedly set and lies in a frequency range of for example 10 MHz to 200 MHz. It is also possible for other pulsed sources, e.g., ps laser diodes, to be used that do not generate equidistant pulses.

The laser system 1 can include an optical selection device (e.g., an optical selector such as a pulse picker) 6, e.g. in the form of an input-side AOM (acousto-optic modulator) or EOM (electro-optic modulator), for the targeted selection or transmission of some of the input laser pulses 5. The selected input laser pulses $5_1$, $5_2$, $5_3$ are transmitted without deflection by the pulse picker 6, while the non-selected input laser pulses 5 are coupled out and directed onto an absorber 7.

The laser system 1 can further include an optical amplifier 8 for amplifying the selected input laser pulses $5_1$, $5_2$, $5_3$, and an optical output coupling unit (e.g., an optical output coupler) 9, for example, in the form of an output-side AOM or EOM, for coupling out amplified input laser pulses $5_1'$, $5_2'$, $5_3'$. The amplifier 8 here has an amplification-free minimum time period $T_{min}$, which can be specified by the inversion buildup necessary for a minimum amplification in the optical amplifier 8, and a maximum time period $T_{max}$, which can be specified by the inversion buildup necessary for an allowed maximum amplification in the optical amplifier 8. The minimum time period $T_{min}$ is based on the fact that, after a pulse amplification, the inversion in the gain medium of the amplifier 8 first has to be built up again so as to ensure a pulse-to-pulse stability. The maximum time period $T_{max}$ prevents pulse pauses that are too long and thus amplifications that are too large and result in undesirable excessive pulse increases (e.g., excessive pulse increases which could damage the optical elements of the amplifier 8, or nonlinear processes in the active medium, which give rise to pulse shape changes or cause thermal effects at the optical elements of the amplifier 8). The amplified input laser pulses $5_1'$, $5_2'$, $5_3'$ arrive at the output 3 at the time points $t_1$, $t_2$, $t_3$ in the form of amplified output laser pulses $2_1$, $2_2$, $2_3$. In some examples, the maximum time period $T_{max}$ is a multiple of $T_{min}$, e.g., $T_{max} 2*T_{min}$.

The laser system 1 can further include a control unit (or a controller) 10, which can temporally drive the pulse picker 6, the output coupler 9 and, at least when using a pulse source 4 with non-equidistant pulse generation, also the pulse generation of the pulse source 4, in accordance with a user request system 11, which requests amplified output laser pulses with individually settable pulse energy at the output 3 at individually settable time points. The control unit 10 can also control the pump power of the amplifier 8, which can be constant.

The following describes the function of the laser system 1 for the case that three amplified output laser pulses $2_1$, $2_2$, $2_3$ with the same pulse energy are requested at the time points $t_1$, $t_2$, $t_3$ at the output 3 by the user request system 11. It is assumed here that the temporal pulse distance $\Delta T_1$ between the first and the second output laser pulse $2_1$, $2_2$ is greater than the maximum time period $T_{max}$ ($\Delta T_1 > T_{max}$) and that the temporal pulse distance $\Delta T_2$ between the second and the third output laser pulse $2_2$, $2_3$ is smaller than the maximum time period $T_{max}$, but greater than the minimum time period $T_{min}$ ($T_{min} < \Delta T_2 < T_{max}$).

The control unit 10 temporally drives the pulse picker 6 such that, from among the input laser pulses 5, only the three that arrive at the output 3 at the respectively requested time points $t_1$, $t_2$, $t_3$ are transmitted. Since the pulse distance $\Delta T_1$ between the first and the second input laser pulse $5_1$, $5_2$ to be amplified is greater than the maximum time period $T_{max}$, the control unit 10 inserts a temporal balance sacrificial laser pulse 12 into the pulse sequence of the selected input laser pulses $5_1$, $5_2$, $5_3$ before the second input laser pulses $5_2$ to be amplified, said sacrificial laser pulse 12 being spaced apart from the second input pulse $5_2$ to be amplified at least by the minimum time period $T_{min}$ and at most by the maximum time period $T_{max}$, preferably by the maximum time period $T_{max}$. To this end, the pulse picker 6 is temporally driven by the control unit 10 to transmit a further one of the input laser pulses 5 as a sacrificial laser pulse 12. Additionally, an energy balance sacrificial laser pulse 13 is coupled in at a temporal distance $T_{mod}$ before the input laser pulse $5_2$, where $T_{mod}$ is less than the maximum time period $T_{max}$ and greater than or the same as the switching time of the output coupler 9. Since the distance between the input laser pulses $5_2$ and $5_3$ that are to be amplified is less than $T_{max}$, here only one energy balance sacrificial laser pulse 13 with adapted pulse energy is coupled in at the temporal distance $T_{mod}$ before the input laser pulse $5_3$. The pulse energy of the energy balance sacrificial laser pulse 13 can be trimmed by driving the pulse picker 6 accordingly. All the other input laser pulses 5 are directed onto the absorber 7 by the pulse picker 6.

The three selected input laser pulses $5_1$, $5_2$, $5_3$, the sacrificial laser pulse 12 and the energy balance sacrificial laser pulses 13 are amplified using the optical amplifier 8 to form the amplified laser pulses $5_1'$, $5_3'$, 12', 13'. If the pulse distance between the amplified sacrificial laser pulse 12' and the preceding pulse is greater than the maximum time period $T_{max}$, said sacrificial laser pulse 12', as shown in FIG. 1, is greater than the pulses $5_1'$, $5_2'$, $5_3'$, because it undergoes greater amplification. The output coupler 9 is temporally driven by the control unit 10 in a manner such that the amplified sacrificial laser pulse 12' and the energy balance sacrificial laser pulses 13' are coupled out and directed onto an absorber 14 and only the three amplified input laser pulses $5_1'$, $5_2'$, $5_3'$ are coupled out. Since $T_{mod}$ is greater than or equal to the switching time of the output coupler 9, the energy balance sacrificial laser pulses 13' can be coupled out independently of the subsequent amplified laser pulses $5'_2$, $5'_3$. The three amplified output laser pulses $2_1$, $2_2$, $2_3$ with the same pulse energy arrive at the output 3 at the time points $t_1$, $t_2$, $t_3$.

If output laser pulses $2_1$, $2_2$, $2_3$ with different pulse energies or pulse shapes are requested at the output 3, a corresponding reduction in energy is effected at the output coupler 9 by way of timed partial output coupling of the amplified input laser pulses $5'_1$, $5'_2$, $5'_3$ in dependence on the known pulse distances thereof from the respectively immediately preceding, amplified input, sacrificial, or energy balance sacrificial laser pulse $5'_1$, $5'_2$, $5'_3$, 12', 13'. Alternatively or additionally, the pulse energy of the energy balance sacrificial laser pulses 13 can also be adapted, in order to obtain output laser pulses 2 with different pulse energies.

If the pulse distance of a requested amplifier pulse from the immediately preceding amplifier pulse is smaller than the minimum time period $T_{min}$, a different input laser pulse is selected instead of the input laser pulse that is actually to be selected, the temporal pulse distance of which from the immediately preceding, selected input laser pulse is identical to or minimally greater than the minimum time period $T_{min}$. The pulse picker 6 is thus driven with a time delay, for example by way of a delay signal being superposed on the actual selection signal and by an input laser pulse being selected, the temporal pulse distance of which is identical to or minimally greater than the minimum time period $T_{min}$. Preferably, all the electrical trigger signals selecting the input laser pulses are subjected to a delay $T_{min}$ by the user request system 11, with the result that the minimum time period $T_{min}$ is maintained for all trigger signals and sacrificial laser pulses can be inserted, if appropriate. In other words, all the input laser pulses are subjected to a fixed delay. The minimum time period $T_{min}$ is at least long enough for an assessment as to whether sacrificial and energy balance sacrificial laser pulses 12, 13 are required to be able to be performed by the control unit 10.

The control unit 10 can have a comparison unit (or a comparator) 10a, which compares the pulse distances $\Delta T_1$, $\Delta T_2$ of the selected input laser pulses $5_1$, $5_2$, $5_3$ to the specified maximum time period $T_{max}$ and, if the pulse distance is too great, outputs a control signal to the pulse picker 6 to insert a sacrificial laser pulse 12 and/or an energy balance sacrificial laser pulse 13 into the pulse sequence of the selected input laser pulses $5_1$, $5_2$, $5_3$. The control unit 10 can furthermore have a determination and comparison unit 10b, which determines the expected pulse energy of the amplified output laser pulses $2_1$, $2_2$, $2_3$ in advance for the selected input laser pulses $5_1$, $5_2$, $5_3$ and compares the expected pulse energy to the specified pulse energy and outputs a control signal to the pulse picker 6, to insert an energy balance sacrificial laser pulse 13 with adapted pulse energy into the pulse sequence of the selected input pulses $5_1$, $5_2$, $5_3$, to couple out an output laser pulse $2_1$, $2_2$, $2_3$ with the specified pulse energy in this way.

In some examples, the pulse energies of the sacrificial laser pulses 12 are selected to be the same as the pulse energy of the input laser pulses 5 that are to be amplified.

Figure 2:
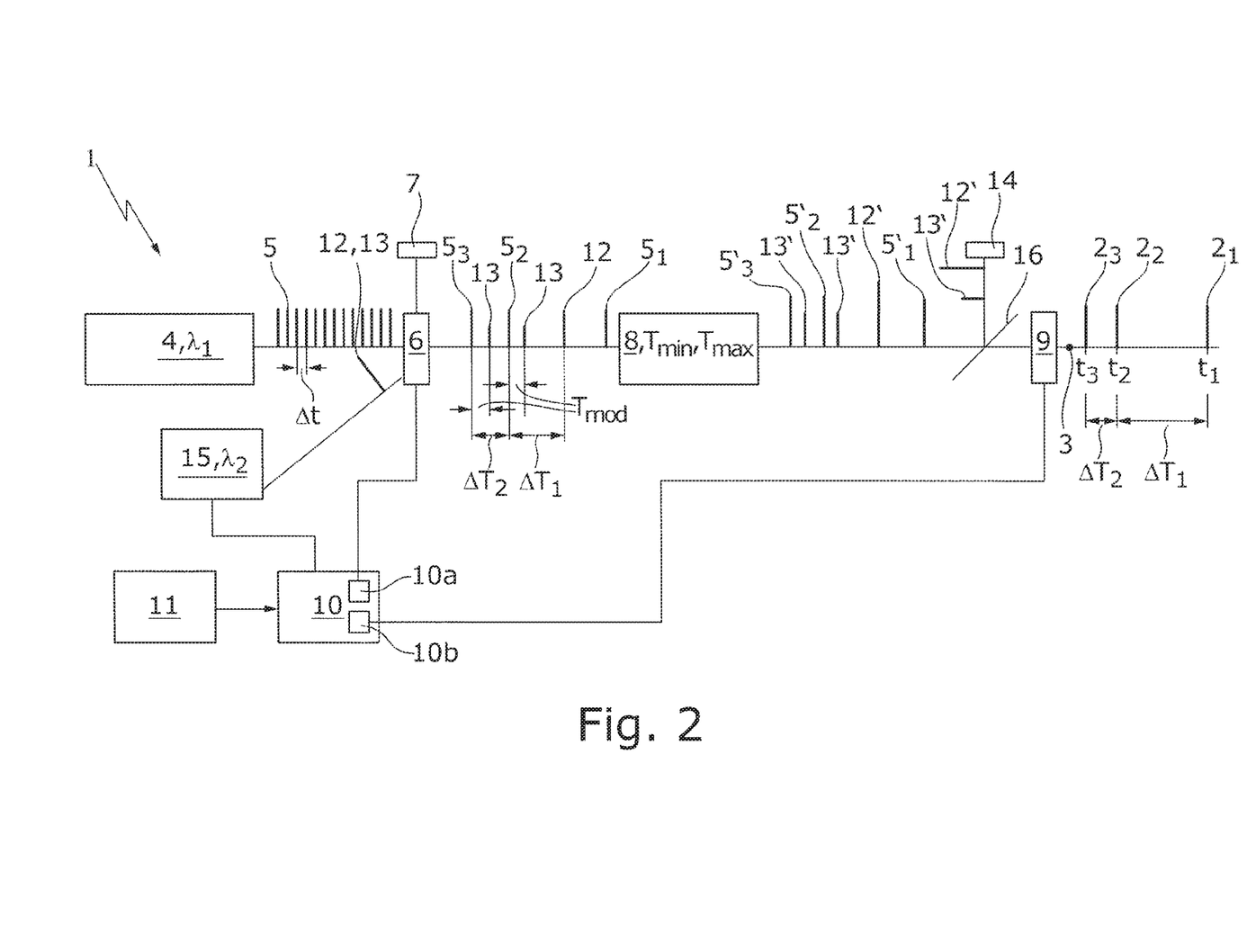
FIG. 2 schematically shows a second embodiment of a laser system according to the present disclosure for generating identical, amplified output laser pulses using inserted sacrificial and energy balance sacrificial laser pulses.

The laser system 1 shown in FIG. 2 differs from the laser system of FIG. 1 in that the sacrificial laser pulse 12 and/or the energy balance sacrificial laser pulse 13 are/is generated here by an external pulse source (e.g., a laser diode) 15 that is driven by the control unit 10. The sacrificial laser pulse 12 and/or the energy balance sacrificial laser pulse 13 can have the same wavelength $\lambda_1$ as the input laser pulses 5 or else, as in FIG. 2, a different wavelength $\lambda_2$. The sacrificial laser pulse 12 and/or the energy balance sacrificial laser pulse 13 are/is inserted by the control unit 10 into the pulse sequence of the selected input laser pulses $5_1$, $5_2$, $5_3$, and the amplified sacrificial laser pulse 12' and/or the amplified energy balance sacrificial laser pulse 13' are/is coupled out by a wavelength-selective element 16 (e.g., a dichroic mirror, a diffractive element, or a VBG [Volume Bragg Grating]), arranged upstream of the output coupler 9, and directed onto the absorber 14. Unlike the case shown in FIG. 2, the amplified sacrificial laser pulse 12' and/or the amplified energy balance sacrificial laser pulse 13' can also overlap with one of the pulses $5'_1$, $5'_2$, $5'_3$.

Figure 3A:
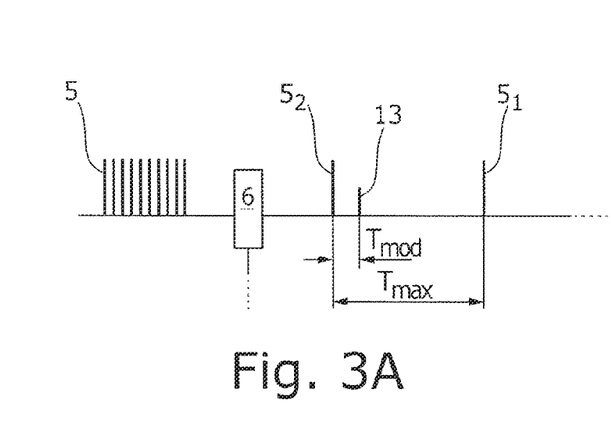
FIGS. 3A, 3B show pulse energies of different values of inserted energy balance sacrificial laser pulses.
Figure 3B:
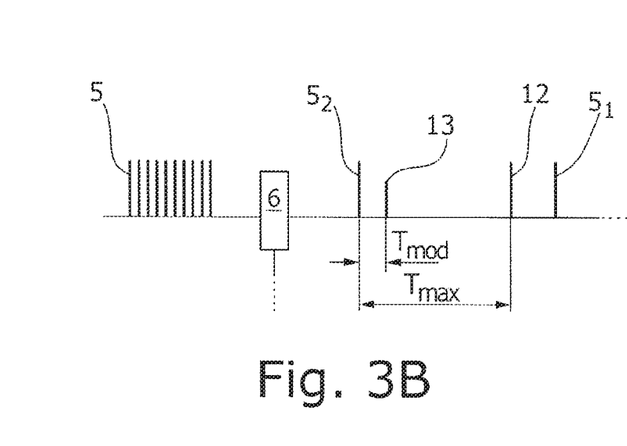

As shown in FIGS. 3A, 3B, the pulse energy of the energy balance sacrificial laser pulse 13 is adapted in dependence on how far it is spaced from the preceding, here the first, input pulse 5i that is to be amplified. In FIG. 3B, the energy balance sacrificial laser pulse 13 is spaced further from the first input pulse $5_1$ that is to be amplified than in FIG. 3A, and so, for depleting the inversion built up in the gain medium of the amplifier 8 since amplifying the first input pulse $5_1$, a higher energy balance sacrificial laser pulse energy is required for the higher inversion built up in FIG. 3B than for the lower inversion built up in FIG. 3A. If the distance between two input pulses $5_1$ and $5_2$ that are to be amplified is greater than $T_{max}$ (FIG. 3B), a sacrificial laser pulse 12 is also inserted into the pulse sequence in addition to the energy balance sacrificial laser pulse 13.

Figure 4:
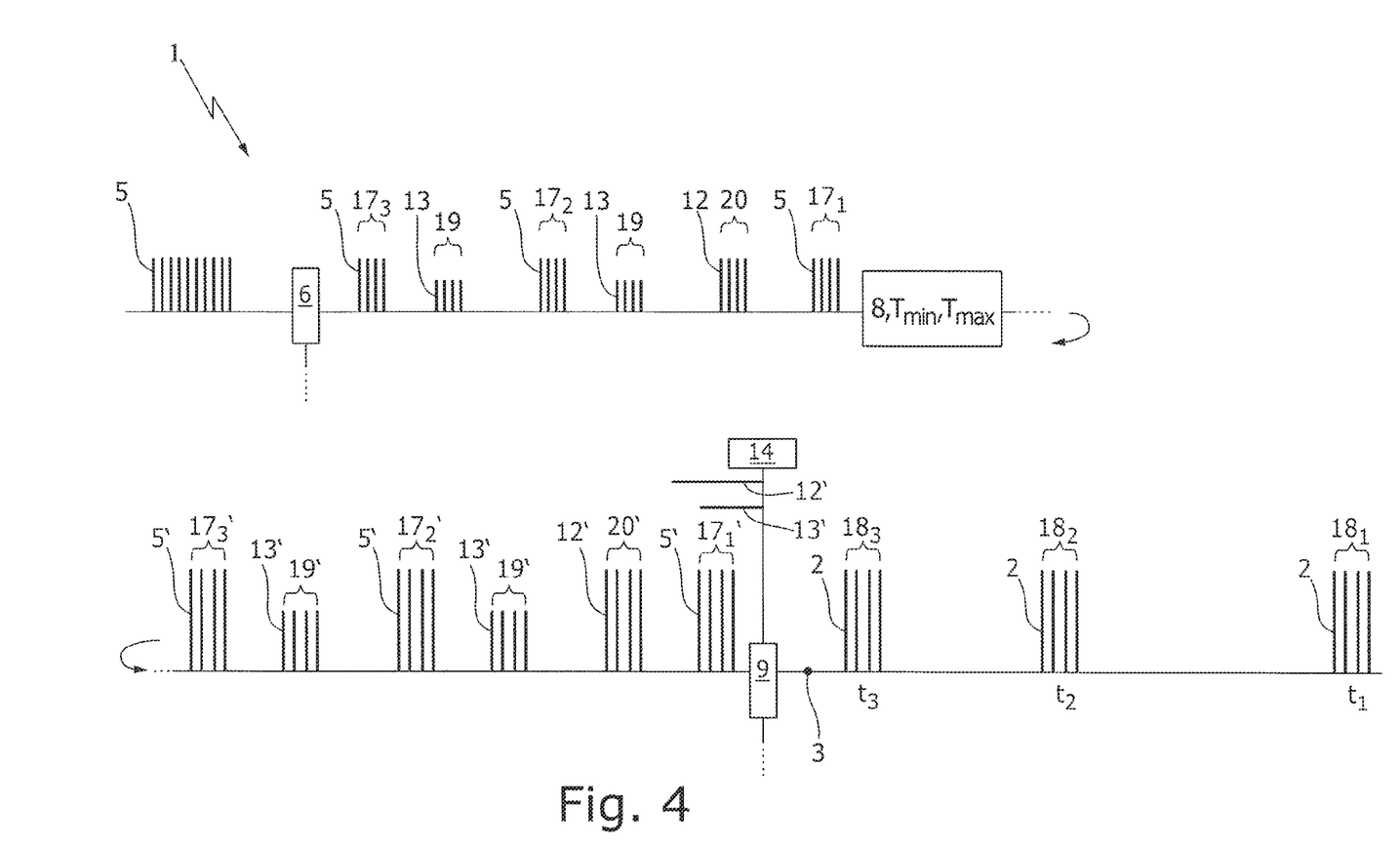
FIG. 4 schematically shows a third embodiment of a laser system according to the present disclosure for generating identical, amplified output burst pulses using inserted sacrificial and energy balance sacrificial laser pulses.

The laser system 1 shown in FIG. 4 differs from FIG. 1 in that here identical pulse packets (burst pulses) $17_1$, $17_2$, $17_3$, each consisting of a plurality of, here four, equidistant input laser pulses 5, are selected using the pulse picker 6 instead of individual input laser pulses, which pulse packets are then amplified in the amplifier 8 to form output burst pulses $18_1$, $18_2$, $18_3$. Between the burst pulses $17_1$, $17_2$, $17_3$, a respective energy balance sacrificial burst 19 is inserted, each consisting of a plurality of, here four, energy balance sacrificial pulses 13 with the same equidistant inter-pulse distance as the individual input laser pulses 5 of the burst pulses $17_1$, $17_2$, $17_3$, to improve the stability of the laser system 1. Since the pulse distance $\Delta T_1$ between the first and the second burst pulses $17_1$, $17_2$ that are to be amplified is greater than the maximum time period $T_{max}$, a sacrificial pulse burst 20, each consisting of a plurality of, here four, sacrificial laser pulses 12 with the same equidistant inter-pulse distance as the individual input laser pulses 5 of the burst pulses $17_1$, $17_2$, $17_3$, is inserted by the control unit 10 before the second burst pulses $17_2$ to be amplified. This sacrificial pulse burst 20 is spaced from the second burst pulse $17_2$ that is to be amplified by at least the minimum time period $T_{min}$, but by at most the maximum time period $T_{max}$. The amplified sacrificial and energy balance sacrificial bursts 19, 20 are coupled out by the output coupler 9 and directed onto the absorber 14.

The methods described function merely on account of the temporal driving of the pulse picker 6 and of the output coupler 9 by way of the control unit 10, that is to say no regulation is performed.

The laser systems 1 shown can additionally be subject to a regulation of the pump power and to a regulation of the pulse energy of the input laser pulses 5.

What is claimed is:

1. A method for generating amplified output laser pulses with individually specified pulse energies at individually specified time points at an output of a laser system, the method comprising:

providing a first pulse sequence of input laser pulses with each input laser pulse having a same pulse energy and a same temporal pulse distance that is smaller than a temporal pulse distance between two neighboring amplified output laser pulses;

selecting, among the first pulse sequence of input laser pulses, a respective input laser pulse that arrives at the output at or close to each of the specified time points to form a second pulse sequence of input laser pulses that are to be amplified by an optical amplifier having a specified, amplification-free minimum time period and a specified, amplification-free maximum time period;

coupling, into the second pulse sequence of input laser pulses to be amplified, at least one energy balance sacrificial laser pulse at a temporal distance of less than the specified maximum time period before at least one input laser pulse to be amplified;

in response to determining that a temporal pulse distance between two successive input laser pulses to be amplified is greater than the specified, amplification-free maximum time period, inserting at least one temporal balance sacrificial laser pulse into the second pulse sequence of input laser pulses before a subsequent one of the two successive input laser pulses, wherein the temporal balance sacrificial laser pulse is spaced apart from a subsequent input pulse to be amplified by no more than the specified maximum time period;

amplifying, using the optical amplifier, the second pulse sequence of input laser pulses together with the temporal balance sacrificial laser pulse and the energy balance sacrificial laser pulse; and coupling out the amplified temporal balance sacrificial laser pulse and the amplified energy balance sacrificial laser pulse from the amplified second pulse sequence of the input laser pulses upstream of the output to obtain the amplified output laser pulses at the output with the specified pulse energies at the specified time points.

2. The method of claim 1, wherein a partial output coupling of the amplified second pulse sequence of input laser pulses at the output is controlled based on a comparison of an expected pulse energy of an amplified output laser pulse to the specified pulse energy of the amplified output laser pulse, and wherein the expected pulse energy of the amplified output laser pulse is predetermined for a selected input laser pulse corresponding to the amplified output laser pulse.

3. The method of claim 2, wherein the expected pulse energy is determined from a simulation of operating the optical amplifier based on at least one of:

a temporal pulse distance of the selected input laser pulse from an immediately preceding, selected input laser pulse, a pulse energy of the selected input laser pulse, or a pump power of the optical amplifier.

4. The method of claim 1, wherein the specified pulse energies of the amplified output laser pulses are identical to each other.

5. The method of claim 1, further comprising:

in response to determining that a temporal pulse distance of a first input laser pulse from a first immediately preceding, selected input laser pulse is smaller than the specified minimum time period, selecting a second, different input laser pulse, a temporal pulse distance of which from a second immediately preceding, selected input laser pulse is the same as or minimally greater than the specified minimum time period.

6. The method of claim 1, wherein a pulse energy of an energy balance sacrificial laser pulse is selected based on a temporal distance of a selected input laser pulse from an immediately preceding, selected input laser pulse or from a temporal balance sacrificial laser pulse.

7. The method of claim 1, comprising at least one of:

inserting a first one of the first sequence of input laser pulses into the second pulse sequence of input laser pulses as a temporal balance sacrificial laser pulse, or inserting a second one of the first sequence of input laser pulses into the second pulse sequence of input laser pulses as an energy balance sacrificial laser pulse.

8. The method of claim 1, comprising at least one of:

inserting a first external laser pulse having a wavelength different from a wavelength of the input laser pulses into the second pulse sequence of input laser pulses as a temporal balance sacrificial laser pulse, or inserting a second external laser pulse having a wavelength different from the wavelength of the input laser pulses into the second pulse sequence of input laser pulses as an energy balance sacrificial laser pulse.

9. The method of claim 1, wherein the specified maximum time period is a multiple of the specified minimum time period.

10. The method of claim 1, wherein the temporal pulse distance between the two neighboring amplified output laser pulses is greater by at least one order of magnitude than the temporal pulse distance of the first pulse sequence of input laser pulses.

11. The method of claim 1, wherein the second pulse sequence of input laser pulses comprises a first selected input laser pulse preceding other selected input laser pulses, and wherein the method further comprises:

inserting at least one sacrificial laser pulse into the second pulse sequence of input laser pulses before the first selected input laser pulse, wherein the at least one sacrificial laser pulse comprises a temporal balance sacrificial laser pulse or an energy balance sacrificial laser pulse.

12. The method of claim 1, further comprising:

reducing pulse energies of the amplified second pulse sequence of input laser pulses by an optical output coupler, wherein the amplified temporal balance sacrificial laser pulse and the amplified energy balance sacrificial laser pulse are coupled out by the optical output coupler.

13. The method of claim 1, further comprising:

generating a plurality of bursts of selected, equidistant input laser pulses from the second pulse sequence of input laser pulses; and inserting a sacrificial burst into one of the plurality of bursts of selected, equidistant input laser pulses, wherein the sacrificial burst comprises a plurality of sacrificial laser pulses with a sacrificial temporal pulse distance, wherein a number of the plurality of sacrificial laser pulses in the sacrificial burst is same as a number of the selected, equidistant input laser pulses in the one of the plurality of bursts, and wherein the sacrificial temporal pulse distance is same as a temporal pulse distance of the selected, equidistant input laser pulses in the one of the plurality of bursts.

14. A laser system for generating amplified output laser pulses with individually specified pulse energies at individually specified time points at an output, the laser system comprising:

a pulse source configured to generate input laser pulses with a same pulse energy and a same temporal pulse distance that is smaller than a temporal pulse distance between two neighboring amplified output laser pulses;

an optical selector configured to select at least one of the input laser pulses;

an optical amplifier configured to amplify at least one selected input laser pulse, wherein the optical amplifier has a specified, amplification-free minimum time period and a specified, amplification-free maximum time period;

an optical output coupler configured to couple out at least one portion of amplified laser pulses; and a controller configured to temporally drive the optical selector and the optical output coupler, wherein the laser system is configured to perform operations comprising:

selecting, by the optical selector and among a first pulse sequence of input laser pulses generated by the pulse source, a respective input laser pulse that arrives at the output at or close to each of the specified time points to form a second pulse sequence of input laser pulses that are to be amplified by the optical amplifier;

coupling, into the second pulse sequence of input laser pulses, at least one energy balance sacrificial laser pulse at a temporal distance of less than the specified maximum time period before at least one input laser pulse to be amplified;

in response to determining that a temporal pulse distance between two successive input laser pulses to be amplified is greater than the specified maximum time period, inserting at least one temporal balance sacrificial laser pulse into the second pulse sequence of input laser pulses before a subsequent one of the two successive input laser pulses, wherein the temporal balance sacrificial laser pulse is spaced apart from a subsequent input pulse to be amplified by no longer than the specified maximum time period;

amplifying, by using the optical amplifier, the second pulse sequence of input laser pulses together with the temporal balance sacrificial laser pulse and the energy balance sacrificial laser pulse; and coupling out, by the optical output coupler, the amplified temporal balance sacrificial laser pulse and the amplified energy balance sacrificial laser pulse from the amplified second pulse sequence of input laser pulses upstream of the output to obtain the amplified output laser pulses at the output with the specified pulse energies at the specified time points.

15. The laser system of claim 14, further comprising:

an external pulse source configured to generate laser pulses having a different wavelength from the input laser pulses of the pulse source, wherein the external pulse source is configured to generate at least one sacrificial laser pulse to be inserted into the second pulse sequence of input laser pulses, and wherein the at least one sacrificial laser pulse comprises a temporal balance sacrificial laser pulse or an energy balance sacrificial laser pulse.

16. The laser system of claim 14, wherein the controller is configured to:

compare temporal pulse distances of the selected input laser pulses to the specified maximum time period; and in response to determining that one of the temporal pulse distances is substantially greater than the specified maximum time period, output a control signal to the optical selector or an external pulse source to insert at least one sacrificial laser pulse into the second sequence of input laser pulses, wherein the at least one sacrificial laser pulse comprises a temporal balance sacrificial laser pulse or an energy balance sacrificial laser pulse.

17. The laser system of claim 14, wherein the controller is configured to:

determine an expected pulse energy of an amplified output laser pulse for a selected input laser pulse corresponding to the amplified output laser pulse;

compare the expected pulse energy to a specified pulse energy of the amplified output laser pulse; and output a control signal for generating an energy balance sacrificial laser pulse with the specified pulse energy based on a result of the comparison.

18. The laser system of claim 14, further comprising:

a user request system connected to the controller and configured to individually specify the pulse energies and the time points of the output laser pulses at the output.

19. The laser system of claim 14, wherein at least one of the pulse selector or the optical output coupler comprises:

an acousto-optic modulator (AOM) or an electro-optic modulator (EOM).

20. The laser system of claim 14, further comprising:

a wavelength selector configured to couple out laser light having a different wavelength than that of the input laser pulses generated by the pulse source, wherein the wavelength selector is arranged upstream or downstream of the optical output coupler.

21. A non-transitory computer-readable storage medium coupled to at least one processor and storing programming instructions for execution by the at least one processor, wherein the programming instructions instruct the at least one processor to perform operations for generating amplified output laser pulses with individually specified pulse energies at individually specified time points at an output of a laser system, the operations comprising:

providing a first pulse sequence of input laser pulses with a same pulse energy and a same temporal pulse distance that is smaller than a temporal pulse distance between two neighboring amplified output laser pulses;

selecting, among the first pulse sequence of input laser pulses, a respective input laser pulse that arrives at the output at or close to each of the specified time points to form a second pulse sequence of input laser pulses that are to be amplified by an optical amplifier having a specified, amplification-free minimum time period and a specified, amplification-free maximum time period;

coupling, into the second pulse sequence of input laser pulses to be amplified, at least one energy balance sacrificial laser pulse at a temporal distance of less than the specified maximum time period before at least one input laser pulse to be amplified;

in response to determining that a temporal pulse distance between two successive input laser pulses to be amplified is greater than the specified maximum time period, inserting at least one temporal balance sacrificial laser pulse into the second pulse sequence of input laser pulses before a subsequent one of the two successive input laser pulses, wherein the temporal balance sacrificial laser pulse is spaced apart from a subsequent input pulse to be amplified by no longer than the specified maximum time period;

amplifying, using the optical amplifier, the second pulse sequence of input laser pulses together with the temporal balance sacrificial laser pulse and the energy balance sacrificial laser pulse; and coupling out the amplified temporal balance sacrificial laser pulse and the amplified energy balance sacrificial laser pulse from the amplified second pulse sequence of input laser pulses upstream of the output to obtain the amplified output laser pulses at the output with the specified pulse energies at the specified time points.

\* \* \* \* \*